United States Patent [19]

Greene

[11] 4,129,005
[45] Dec. 12, 1978

[54] MOMENTARY TORQUE MAXIMIZING METHOD AND APPARATUS

[76] Inventor: Clarence K. Greene, 100 N. Arlington Ave., Reno, Nev. 89501

[21] Appl. No.: 574,568

[22] Filed: May 27, 1975

[51] Int. Cl.² ............................................. F01B 21/00
[52] U.S. Cl. ..................................... 60/715; 60/716; 415/61; 74/661
[58] Field of Search ................. 60/715, 718, 716, 717; 415/60, 61; 74/661, 665 R, 665 D

[56] References Cited

U.S. PATENT DOCUMENTS

| | | | |
|---|---|---|---|
| 1,296,378 | 3/1919 | Fottinger | 60/715 |
| 2,007,032 | 7/1935 | Wach | 60/715 |
| 2,155,434 | 4/1939 | Marsh | 74/661 |
| 2,172,910 | 9/1939 | Keller | 415/60 |
| 2,333,611 | 11/1949 | Wolf | 74/665 D |
| 2,553,839 | 5/1951 | Anderson | 415/61 |
| 2,563,279 | 8/1951 | Rushing | 415/60 |
| 2,662,369 | 12/1953 | Baggerud | 60/718 X |
| 2,756,962 | 7/1956 | Joyce | 415/61 X |
| 2,779,212 | 1/1957 | Fell | 74/661 |
| 2,987,939 | 6/1961 | Waninger | 74/665 D |
| 3,826,093 | 7/1974 | Miliaras | 60/662 X |

*Primary Examiner*—Allen M. Ostrager
*Attorney, Agent, or Firm*—Herbert C. Schulze

[57] ABSTRACT

This is a method, and an apparatus for performing said method, wherein the latent energy in expansible fluids is utilized in a multi stage series of expanders, or energy extractors, wherein succeeding expanders or energy extractors derive energy from fluid emanating from a preceding expander from which some energy was previously derived; and, wherein, important features are: the ability to maximize the torque output from the combined units as necessary for special load conditions by bypassing the primary fluid around one expander and into a succeeding expander with the bypassed expander being immmobilized; and differential coupling of the mechanical output of the expanders for utilization of maximum output and efficiency under varying conditions of capacity of the expanders due to changes in fluid and load conditions.

6 Claims, 1 Drawing Figure

MOMENTARY TORQUE MAXIMIZING METHOD AND APPARATUS

CROSS REFERENCE TO RELATED PATENT APPLICATIONS

This application is related to my application for "Multiple Fluid Expansion Energy Extraction Method and Apparatus" filed concurrently herewith.

BACKGROUND OF THE INVENTION

1. Field of the Invention

This invention is in the general field of methods and devices for extracting energy from fluids which are expandible, such as steam, hot brines, and the like. The invention is more particularly directed to a method and apparatus by which the fluid is passed, successively, through successive expanders in such manner that one expander removes a portion of the latent energy of the fluid and the next expander removes a successive portion of the energy so as to achieve full utilization of the energy available, and wherein an expander may be bypassed and immobilized by supplying primary fluid directly to a succeeding expander with load distribution through differential means.

2. Description of the Prior Art

There have been many attempts at providing successive expansions of working fluids utilizing the principle of extracting latent energy from an expansible fluid, such as double expansion steam engines, and the like. In general certain fixed relationships are involved and the successive expansion arrangements do not necessarily always utilize fully the available energy due to improper balancing of the distribution of power and load. Such systems generally contemplate a single mechanical output common to all of the successive expanders by direct coupling. The present invention is unique in that the differential coupling balances changes in capacity of the expanders and accommodates to unusual load conditions by bypassing and differential means.

SUMMARY OF THE INVENTION

In the present atmosphere of world-wide concern over energy, it has become increasingly important to maximize the use of energy and, particularly, to provide effective means for utilizing such energy as the energy available in hot fluids (such as hot brines beneath the surface of the earth) and steam systems and the like. I have been studying and working in this field for some period of time and have been disturbed by the present inability to achieve maximum utilization of the latent energy in such fluids as hot brines and the like as well as being concerned with the inability in such systems as exist to provide for maximum bursts of power as may be required because of unusual load conditions.

The function of feeding steam or hot brines or the like into expanders which convert the latent energy therein into mechanical or electrical energy is well known. It is also known that, under proper circumstances, steam or the like can be utilized in a primary expander and the exhaust can be utilized in a secondary expander, and so on. In such systems as exist, however, problems of balancing of loads with input and output due to fluctuations between successive expanders have been severe. Additionally, there is always the problem of the utilization of the full maximum surges of energy available at times of peak load requirement or the like.

In my investigation, I have conceived a unique and improved method for the multiple utilization of expanders wherein the input to the output load is constantly balanced in order to achieve full power from each of the expanders and without having any loss resulting from malfunction or variable fluctuations in various expanders; and, I have also arrived at a unique method for a great multiplication of the torque output when desired, even though at the expense of efficiency, by immobilizing the primary expander and bypassing primary fluid to a second expander.

I have accomplished the end desired by means of a new, unique, and improved method and apparatus wherein the original expandible fluid is passed to a primary expander and in which the output from the expander is differentially connected to the output of a second expander — which second expander is so adapted as to receive either the exhaust from the first expander or, for moments of maximum load, the primary input independent of the primary expander. One of the means by which I accomplish this is by utilizing, as the secondary expander, a much larger expander, normally so adapted as to properly receive the previously expanded fluid from the primary expander. When an excess of the primary fluid is bypassed directly to this secondary expander, a large excess of torque is provided. In order to prevent any overrunning or back-torque loss, a clutch, or braking arrangement, such as a one-way roller clutch, is provided on the primary expander so that it cannot move any backward direction thus effectively using the system in this mode for full output from the primary expander.

Likewise a clutch or braking arrangement of the same nature will be provided on the secondary expander, and in this manner there is no back spinning or free running when the primary expander is initially activated and before the secondary expander receives workable fluid.

This arrangement is particularly well adapted to such applications as steam automotive vehicles, since I have provided a means by which the fluctuations in the capacities of the expanders and in the load requirement may be accommodated in a most effective manner retaining an efficient utilization of the output of the coupled expanders. In that instance where the fluid is bypassed to a succeeding expander, the torque is effectively doubled since the primary expander is immobilized and its coupled differential element is likewise immobilized.

It is an object of this invention to provide a method and means for utilizing an expansible fluid for the extraction of latent energy therefrom and conversion into mechanical energy or the like wherein multiple stages of expansion of said fluid are utilized and in which the mechanical output from the expanders is differentially coupled.

Another object of this invention is to provide such a method and apparatus as previously mentioned, wherein, for momentary periods, a secondary expander can receive the direct output of fluid from the primary fluid source of maximum torque output.

Another object of this invention is to provide such a method and apparatus as previously mentioned, wherein, changes in capacity and load or in the condition of the expansible fluid will be most effectively compensated for and handled effectively.

The foregoing and other objects and advantages of this invention will be clear to those skilled in the art upon reading the description of a preferred embodiment which follows in conjunction with the appended drawings.

DESCRIPTION OF A PREFERRED EMBODIMENT

Figure 1:
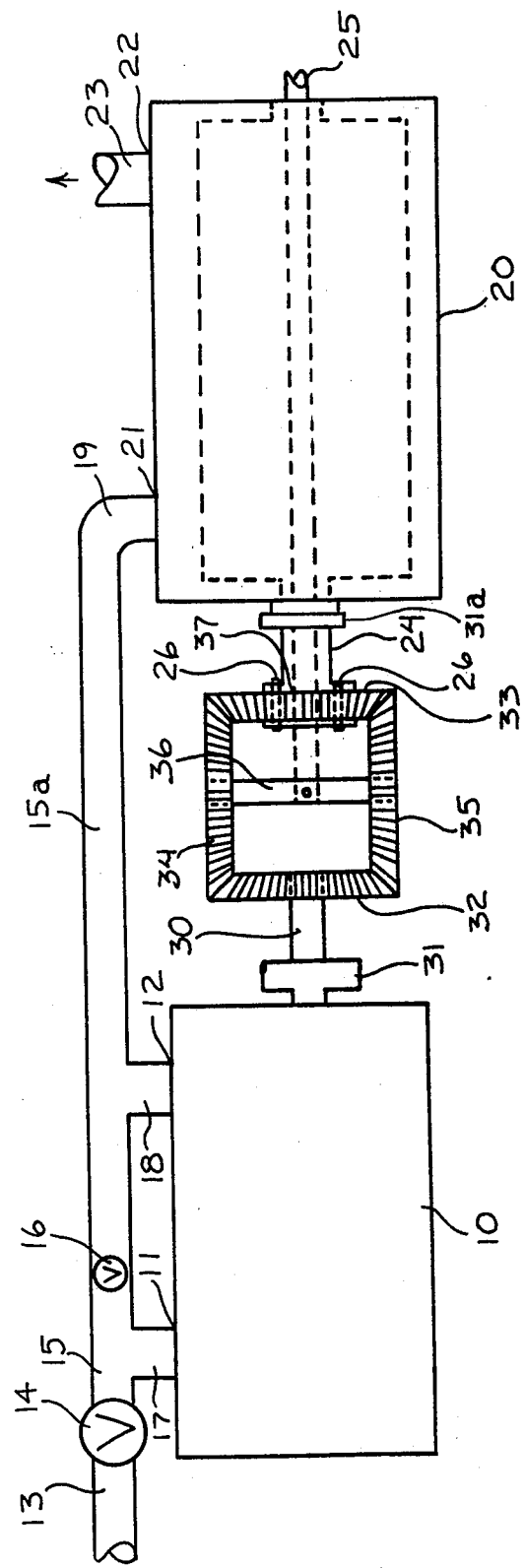
FIG. 1 is a schematic block diagram of a preferred apparatus for practicing the method of this invention.

It will be observed by studying FIG. 1 that two expanders are provided. The first expander 10 may be of any type as is known in the art, but will preferably be of the Lysholm type. The expander has an inlet at 11 and an exhaust at 12 and operates in a manner well known to those skilled in the art. The expander 10 has a shaft 30 to which is attached a one-way clutch, such as a roller clutch 31 so that the expander may only turn in the direction in which it is operating and receiving fluid through its intake 11 and exhausting through its exhaust 12.

The fluid, such as steam from a steam source, hot brine from beneath the earth's surface, or the like, enters through a ducting arrangement 13 which has therein a control valve 14 for adjusting the amount of fluid entering the system. A duct 15 has a branch 17 as indicated and also connects to valve 16. The duct 15 is directly interconnected through duct 17 to the inlet port 11 of the primary expander. The valve 16 connects duct 15 to duct 15a which connects duct 18 to the exhaust port 12 of the primary expander and connects duct 19 to the inlet port 21 of the secondary expander 20. The valve 16 is provided intermediate to ducting 15 and 15a so as to allow for the passage of the working fluid through duct 15a or only through duct 17 as may be desired.

It is observed that the shaft 30 is connected to a beveled gear 32 being of a pair of beveled gears in a differential type mechanism.

With attention turned now to expander 20, it is noticed that this has been represented schematically larger in size than the expander 10; the increased size will be such that ordinarily the expander 20 will be accommodating an expanded fluid which has passed through expander 10 and is being exhausted through duct 18, duct 15a and into duct 19. Thus the expander will normally be of larger size to accommodate the larger expanded fluid entering. The exhaust from expander 20 will be through an exhaust port 22 and exhaust duct 23. Such exhaust will normally be carried to a condenser for ultimate reuse through a boiler or the like, or may be otherwise disposed of.

A rotor 24 of the secondary expander (this expander should again preferably be of the Lysholm type) is shown schematically to be bored so as to allow the passage therethrough of final output shaft 25 from which the ultimate power of the system is derived. The rotor 24 is seen to be fastened by bolts or the like 26 to beveled gear 33 which is the matching beveled gear to 32 in the differential arrangement. Beveled pinions 34 and 35 are provided between the gears 32 and 33 so as to provide a complete differential mechanism in a manner known to those skilled in the art. The beveled pinions 34 and 35 will normally be carried on a carrier 36. Such carriers are known in the art and are normally referred to as "spiders" or the like. It will be observed that the spider or carrier 36 in this case is connected directly to output shaft 25 which is shown not only to be passing through the rotor 24 but also through a bore 37 in the beveled gear 33.

In normal usage, the working fluid will enter through duct 17 into inlet 18 and operate expander 10 exhausting through duct 18 and through the piping into inlet port 21 in the secondary expander. At this stage, the previously partially used working fluid operates the secondary expander so that at all times in this mode both expanders are working and utilizing a maximum amount of the energy available in the working fluid. Through the differential coupling as indicated, the output from the primary expander and the secondary expander will be balanced so as to provide no conflict of the output between the two and the total output is extracted at the end of shaft 25.

In a system such as I have described there has sometimes been the disadvantage that there are certain load conditions wherein a greatly increased torque is required even though at the expense of efficiency of utilization of the working fluid. I have now conceived and incorporated a method by which an unusual burst of torque can be utilized and obtained merely by opening the gate valve 16 and allowing the working fluid to bypass expander 10. Since the working fluid will be balanced at inlet 11 and exhaust 12 on expander 10, this expander will have a tendency to do nothing at this stage. In the event anything should occur, however, which might cause this expander to tend to run backwards the one-way clutch arrangement 31 has been provided so that the expander cannot run backwards. In this mode, the working fluid passes directly through ducts 15a and 19 into the secondary expander. This larger, secondary expander, now receiving an excessive amount of working fluid directly from the primary source is able to exert a tremendously increased torque. At this stage, since the beveled gear 32 is essentially locked into position, the output will be transmitted through gear 33 and pinions 34 and 35 through the spider 36 directly to output shaft 25 and an unusual amount of torque will be available for so long as may be desired.

It is to be noted that the roller clutch or the like 31a prevents back running of shaft 24 and the gear 33 under those conditions when the primary expander 10 is commencing to receive its fluid, but before it has exhausted into expander 20.

It should be particularly pointed out that the valve 14, the main control valve, will be of such nature that the amount of fluid being received may be adjusted. For example, this valve could be a throttle on an automotive vehicle utilizing steam power or the like. Depending upon the degree of opening of the valve, it will be understood, that the degree of motion imparted to the final output shaft 25 will be varied considerably. The unique differential arrangement provided will accommodate the changing quantities and pressures of fluid entering both the primary and secondary expander so as to provide maximum utilization of the power available from the working fluid.

In the case of an automotive vehicle, for example, the bypass valve 16 may be opened, by some direct connection with valve 14, such as when valve 14 is fully opened, or otherwise, so that the bypass takes effect as desired to provide the maximum torque which is desirable. Such valve combination, will be understood by those skilled in the art and may be accomplished in many ways, including by electrically operated valves or the like.

While the embodiment of this invention shown and described is fully capable of achieving the objects and advantages desired, it is to be understood that this has been for purposes of illustration only and not for purposes of limitation.

I claim:

1. The method of utilizing an expansible fluid for extracting the latent energy therein as mechanical power including: (1) providing a primary source of expansible fluid; (2) passing said expansible fluid into a first expander; (3) passing the expanded fluid from the first expander into a secondary expander; (4) exhausting said secondarily expanded fluid from said secondary expander; (5) coupling the output of the first expander to one element of a differential mechanism; (6) coupling the output from the secondary expander to another element of a differential mechanism wherein the outputs from the primary and secondary expanders will be balanced; (7) coupling a third element of the differential mechanism to a final power takeoff; and, (8) alternately bypassing the primary fluid from the primary expander directly to the secondary expander.

2. The method of Claim 1 wherein the output of the primary expander is locked against counter rotation during those times when primary fluid is being diverted directly to the secondary expander.

3. Apparatus for utilizing an expansible fluid for the extraction of latent energy therefrom including a primary expander and a secondary expander wherein the outputs from the primary and secondary expanders will be balanced; differential means connecting the output of said primary and secondary expander; means to pass the expansible fluid through the primary expander and then through the secondary expander; means to bypass the primary fluid around the primary expander and solely to the secondary expander; and, means to lock the output of the primary expander against counter revolutions during those periods when the expansible fluid is directed directly to the secondary expander.

4. The apparatus of Claim 3 in which the secondary expander is provided with a rotor having a bore therethrough accommodating a final output shaft which is connected to one element of a differential mechanism wherein two other elements of the differential mechanism are connected to the rotor of the secondary expander and the output of the first expander.

5. Apparatus for utilizing energy in an expansible fluid comprising: (1) a source of expansible fluid containing latent energy; (2) a primary expander; (3) means connecting said source of expansible fluid to said primary expander; (4) means for removing the expanded fluid from said primary expander; (5) secondary expander of larger size than the primary expander; (6) means conveying the expanded fluid from the primary expander to the secondary expander; (7) differential motion transmitting means including at least three differential elements; (8) means connecting a first element of said differential means to the output of said primary expander; (9) means connecting a second element of said differential means to the output of the secondary expander; (10) output means connected to a third element of said differential means; (11) means connected to the output of said primary expander so as to limit output to one direction only; and, (12) means to connect the source of expansible fluid directly to the means to convey expanded fluid to the secondary expander independent of the primary expander.

6. The method of claim 1 wherein the output of the secondary expander is locked against counter rotation during any times when the primary expander is receiving fluid and prior to fluid exhausted therefrom reaching the secondary expander.

* * * * *